(12) United States Patent
Singhal et al.

(10) Patent No.: US 10,284,657 B2
(45) Date of Patent: May 7, 2019

(54) APPLICATION CONNECTION FOR DEVICES IN A NETWORK

(71) Applicant: SAMSUNG ELECTRONICS CO., LTD., Suwon, Gyeonggi-do (KR)

(72) Inventors: Ashish Singhal, Irvine, CA (US);
Shiangfeng Lee, Irvine, CA (US);
Praveen Kashyap, Irvine, CA (US);
Jason Rowe, Irvine, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 138 days.

(21) Appl. No.: 13/803,723

(22) Filed: Mar. 14, 2013

(65) Prior Publication Data

US 2014/0280981 A1 Sep. 18, 2014

(51) Int. Cl.
*H04W 4/02* (2018.01)
*H04L 29/08* (2006.01)

(52) U.S. Cl.
CPC ............ *H04L 67/142* (2013.01); *H04L 67/02* (2013.01); *H04L 67/141* (2013.01); *H04L 67/146* (2013.01); *H04L 67/18* (2013.01); *H04L 67/22* (2013.01); *H04W 4/02* (2013.01); *H04W 4/026* (2013.01); *H04W 4/027* (2013.01)

(58) Field of Classification Search
CPC .................................................. H04W 84/12
See application file for complete search history.

(56) References Cited

U.S. PATENT DOCUMENTS

| | | |
|---|---|---|
| 8,251,290 B1 | 8/2012 | Bushman et al. |
| 8,555,404 B1 | 10/2013 | Sebes et al. |
| 8,627,438 B1 | 1/2014 | Bhimanaik |
| 8,823,494 B1 | 9/2014 | Kovitz et al. |
| 8,842,310 B2 | 9/2014 | Tredoux et al. |
| 8,850,542 B2 | 9/2014 | Auger |
| 8,891,422 B2 | 11/2014 | Shinohara |
| 8,904,289 B2 | 12/2014 | Strober |
| 8,909,933 B2 | 12/2014 | Pieczul et al. |
| 8,931,062 B2 | 1/2015 | Lee |
| 8,935,777 B2 | 1/2015 | Desoto |
| 8,943,320 B2 | 1/2015 | Sabin et al. |

(Continued)

FOREIGN PATENT DOCUMENTS

| | | |
|---|---|---|
| CN | 101952817 A | 1/2011 |
| CN | 101960824 A | 1/2011 |

(Continued)

OTHER PUBLICATIONS

Lightner, R., "How to share your Wi-Fi acess with a QR code", Jul. 8, 2011, pp. 1-6, CNET How to, CBS Ineractive, United States.

(Continued)

*Primary Examiner* — Sm A Rahman
*Assistant Examiner* — Dae Kim
(74) *Attorney, Agent, or Firm* — Sherman IP LLP; Kenneth L. Sherman; Steven Laut

(57) ABSTRACT

A method for application connection includes receiving a list of application active sessions by a first electronic device based on location of the active sessions in relation to a location of the first electronic device. An active session is selected using the first electronic device to gain access for connection to a first application by the first electronic device.

21 Claims, 12 Drawing Sheets

(56) References Cited

U.S. PATENT DOCUMENTS

| | | | |
|---|---|---|---|
| 8,953,491 B2 | 2/2015 | Clegg | |
| 8,997,241 B2 | 3/2015 | Terwilliger et al. | |
| 9,058,214 B2 | 6/2015 | Ragusa et al. | |
| 9,092,289 B2 | 7/2015 | Bouthillier et al. | |
| 9,288,198 B2 | 3/2016 | Desoto | |
| 2004/0225716 A1 | 11/2004 | Shamir et al. | |
| 2007/0160004 A1 | 7/2007 | Sakhpara | |
| 2009/0210802 A1 | 8/2009 | Hawkins et al. | |
| 2009/0216846 A1 | 8/2009 | Burroughs et al. | |
| 2009/0313705 A1 | 12/2009 | Adams et al. | |
| 2011/0150266 A1 | 6/2011 | Hohndel | |
| 2011/0219427 A1 | 9/2011 | Hito | |
| 2012/0066373 A1 | 3/2012 | Ochoa et al. | |
| 2012/0154449 A1* | 6/2012 | Ramagem | G06F 3/0346 345/684 |
| 2012/0158919 A1 | 6/2012 | Aggarwal | |
| 2012/0252405 A1 | 10/2012 | Lortz et al. | |
| 2012/0254965 A1 | 10/2012 | Parker | |
| 2012/0268553 A1 | 10/2012 | Talukder | |
| 2012/0311165 A1* | 12/2012 | Renschler | H04L 63/0492 709/228 |
| 2013/0023339 A1* | 1/2013 | Davis | G07F 17/3206 463/29 |
| 2013/0115915 A1* | 5/2013 | Tipton | H04W 12/08 455/411 |
| 2013/0124740 A1 | 5/2013 | Liansky et al. | |
| 2013/0212289 A1* | 8/2013 | Krishnakumar | H04L 12/1822 709/228 |
| 2013/0250358 A1 | 9/2013 | Suzuki | |
| 2013/0254519 A1 | 9/2013 | Benoit et al. | |
| 2013/0262873 A1 | 10/2013 | Read et al. | |
| 2013/0304820 A1 | 11/2013 | Vasquez et al. | |
| 2014/0007211 A1 | 1/2014 | Yang et al. | |
| 2014/0040617 A1* | 2/2014 | Fernandez de Torres | H04L 9/28 713/168 |
| 2014/0045472 A1 | 2/2014 | Sharma | |
| 2014/0068727 A1 | 3/2014 | Shamis et al. | |
| 2014/0079217 A1* | 3/2014 | Bai | H04L 63/0869 380/270 |
| 2014/0098952 A1 | 4/2014 | Ikeda | |
| 2014/0113556 A1* | 4/2014 | Kotecha | H04W 76/023 455/41.2 |
| 2014/0187149 A1* | 7/2014 | Lortz | H04W 4/008 455/41.1 |
| 2014/0188990 A1* | 7/2014 | Fulks | H04L 65/403 709/204 |
| 2014/0197232 A1* | 7/2014 | Birkler | G06F 21/313 235/375 |
| 2014/0281522 A1 | 9/2014 | Bortnem et al. | |
| 2014/0282924 A1 | 9/2014 | Singhal | |
| 2014/0298021 A1 | 10/2014 | Kwon et al. | |
| 2014/0304780 A1 | 10/2014 | Kuang et al. | |
| 2015/0047000 A1 | 2/2015 | Spencer, III | |
| 2015/0215770 A1* | 7/2015 | Chan | H04W 12/04 455/456.1 |

FOREIGN PATENT DOCUMENTS

| | | |
|---|---|---|
| CN | 102725747 A | 10/2012 |
| WO | 2012135563 A1 | 10/2012 |

OTHER PUBLICATIONS

Katta, S., "Quick Tip: A QR Code to Share Wifi Passwords with Android", Jan. 11, 2011, pp. 1-3, Skatter.com, United States.

Partial European Search Report dated May 27, 2014 for European Application No. 13198163.1 from European Patent Office, pp. 1-5, Munich, Germany.

Extended European Search Report dated Sep. 9, 2014 for European Application No. 13198163.1 from European Patent Office, pp. 1-12, Munich, Germany.

U.S. Non-Final Office Action for U.S. Appl. No. 13/803,673 dated May 29, 2015.

U.S. Final Office Action for U.S. Appl. No. 13/803,673 dated Jul. 14, 2016.

U.S. Advsiory Action for U.S. Appl. No. 13/803,673 dated Oct. 20, 2016.

U.S. Non-Final Office Action for U.S. Appl. No. 13/803,673 dated Jun. 16, 2017.

European Examination Report dated Nov. 20, 2017 for European Application No. 13198163.1 from European Patent Office, pp. 1-8, Berlin, Germany.

U.S. Final Office Action for U.S. Appl. No. 13/803,673 dated Jan. 19, 2018.

Chinese Office Action dated Mar. 7, 2018 for Chinese Patent Application No. 201410035153.X from Chinese Patent Office, pp. 1-16, Beijing, China (English-language translation included pp. 1-9).

Chinese Office Action dated Oct. 16, 2018 for Chinese Patent Application No. 201410035153.X from Chinese Patent Office, pp. 1-19, Beijing, China (English-language translation included pp. 1-10).

European Office Action dated Aug. 17, 2018 for European Patent Application No. 13198163.1 from European Patent Office, pp. 1-9, Berlin, Germany.

U.S. Advisory Action for U.S. Appl. No. 13/803,673 dated Jul. 9, 2018.

U.S. Non-Final Office Action for U.S. Appl. No. 13/803,673 dated Jan. 7, 2019.

\* cited by examiner

APPLICATION CONNECTION FOR DEVICES IN A NETWORK

TECHNICAL FIELD

One or more embodiments relate generally to applications in a network environment and, in particular, to application connection by devices in a network.

BACKGROUND

Wireless networks use passwords to prevent access to devices and content within the network for security. In order for guests to access a secure wireless network with their devices, the guest devices are required to pair to the wireless network for discovery. In order for pairing to occur, the password for the wireless network has to be given to the guests, which poses a security risk as well as an inconvenience.

SUMMARY

In one embodiment, a method provides for application connection. One embodiment comprises receiving a list of application active sessions by a first electronic device based on location of the active sessions in relation to a location of the first electronic device. In one embodiment, an active session is selected using the first electronic device to gain access for connection to a first application by the first electronic device.

Another embodiment provides a method for application connection that comprises receiving session information by a first device. In one embodiment, the first device includes a first application launched thereon. In one embodiment, an invitation message including the session information is provided to a second electronic device. In one embodiment, the session information is used by the second electronic device to connect to the first application.

One embodiment provides a system for application connection. In one embodiment, a first electronic device executes a first application for generating identification content for the first electronic device. In one embodiment, a second electronic device obtains session information based on the identification content and uses the session information to connect to the first application.

Another embodiment provides a non-transitory computer-readable medium having instructions which when executed on a computer perform a method comprising: generating identification content for a first electronic device. In one embodiment, the first electronic device includes a first application launched thereon. In one embodiment, session information based on the identification content is obtained by a second electronic device. The session information is used by the second electronic device to connect to the first application.

These and other aspects and advantages of the embodiments will become apparent from the following detailed description, which, when taken in conjunction with the drawings, illustrate by way of example the principles of the embodiments.

BRIEF DESCRIPTION OF THE DRAWINGS

For a fuller understanding of the nature and advantages of the embodiments, as well as a preferred mode of use, reference should be made to the following detailed description read in conjunction with the accompanying drawings, in which.

DETAILED DESCRIPTION

The following description is made for the purpose of illustrating the general principles of the embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

One or more embodiments relate generally to application sharing. One embodiment provides connection to an application launched within a local network by electronic devices.

In one embodiment, the electronic devices comprise one or more mobile electronic devices capable of data communication over a communication link such as a wireless communication link. Examples of such mobile device include a mobile phone device, a mobile tablet device, etc. In one embodiment, a method provides for application connection for electronic devices. One embodiment comprises receiving a list of application active sessions by a first electronic device based on location of the active sessions in relation to a location of the first electronic device. In one embodiment, an active session is selected using the first electronic device to gain access for connection to a first application by the first electronic device.

Another embodiment provides a method for application connection for electronic devices that comprises receiving session information by a first device. In one embodiment, the first device includes a first application launched thereon. In one embodiment, an invitation message including the session information is provided to a second electronic device. In one embodiment, the session information is used by the second electronic device to connect to the first application.

Figure 1:
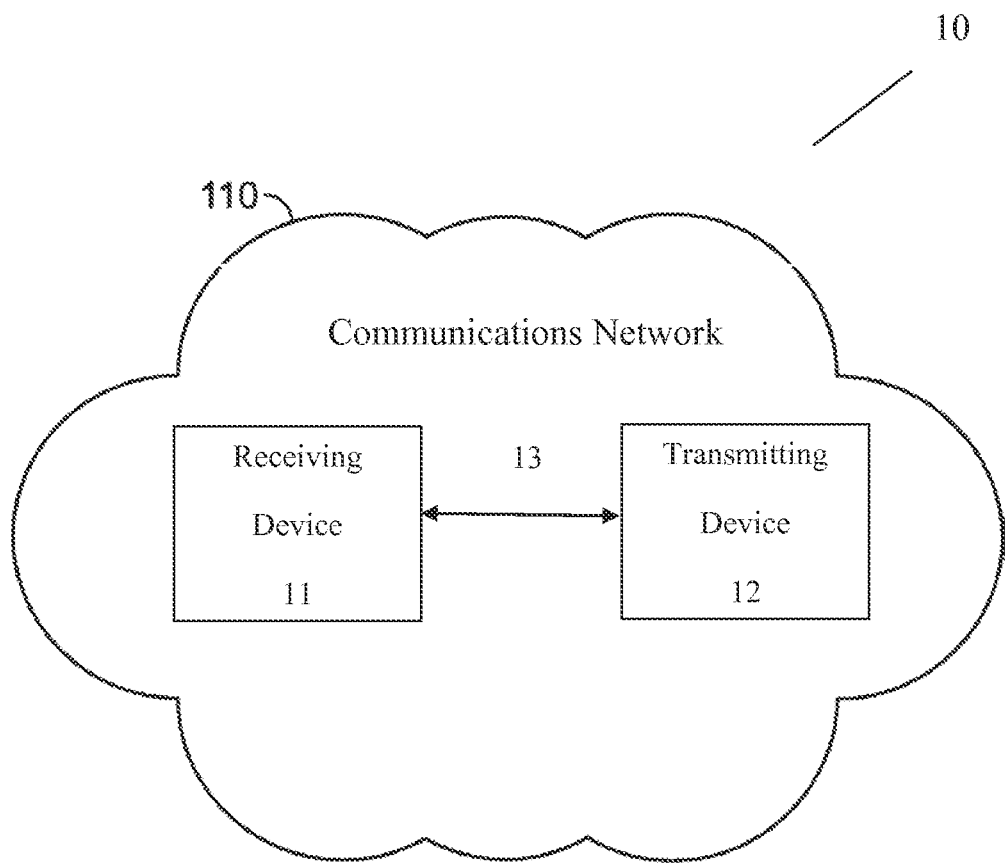
FIG. 1 shows a schematic view of a communications system, according to an embodiment.

FIG. 1 is a schematic view of a communications system in accordance with one embodiment. Communications system 10 may include a communications device that initiates an outgoing communications operation (transmitting device 12) and communications network 110, which transmitting device 12 may use to initiate and conduct communications operations with other communications devices within communications network 110. For example, communications system 10 may include a communication device that receives the communications operation from the transmitting device 12 (receiving device 11). Although communications system 10 may include several transmitting devices 12 and receiving devices 11, only one of each is shown in FIG. 1 to simplify the drawing.

Any suitable circuitry, device, system or combination of these (e.g., a wireless communications infrastructure including communications towers and telecommunications servers) operative to create a communications network may be used to create communications network 110. Communications network 110 may be capable of providing communications using any suitable communications protocol. In some embodiments, communications network 110 may support, for example, traditional telephone lines, cable television, Wi-Fi (e.g., a 802.11 protocol), Bluetooth®, high frequency systems (e.g., 900 MHz, 2.4 GHz, and 5.6 GHz communication systems), infrared, other relatively localized wireless communication protocol, or any combination thereof. In some embodiments, communications network 110 may support protocols used by wireless and cellular phones and personal email devices (e.g., a Blackberry®). Such protocols can include, for example, GSM, GSM plus EDGE, CDMA, quadband, and other cellular protocols. In another example, a long range communications protocol can include Wi-Fi and protocols for placing or receiving calls using VOIP or LAN. Transmitting device 12 and receiving device 11, when located within communications network 110, may communicate over a bidirectional communication path such as path 13. Both transmitting device 12 and receiving device 11 may be capable of initiating a communications operation and receiving an initiated communications operation.

Transmitting device 12 and receiving device 11 may include any suitable device for sending and receiving communications operations. For example, transmitting device 12 and receiving device 11 may include a media player, a cellular telephone or a landline telephone, a personal e-mail or messaging device with audio and/or video capabilities, pocket-sized personal computers such as an iPAQ Pocket PC available by Hewlett Packard Inc., of Palo Alto, Calif., personal digital assistants (PDAs), a desktop computer, a laptop computer, and any other device capable of communicating wirelessly (with or without the aid of a wireless enabling accessory system) or via wired pathways (e.g., using traditional telephone wires). The communications operations may include any suitable form of communications, including for example, voice communications (e.g., telephone calls), data communications (e.g., e-mails, text messages, media messages), or combinations of these (e.g., video conferences).

Figure 2:
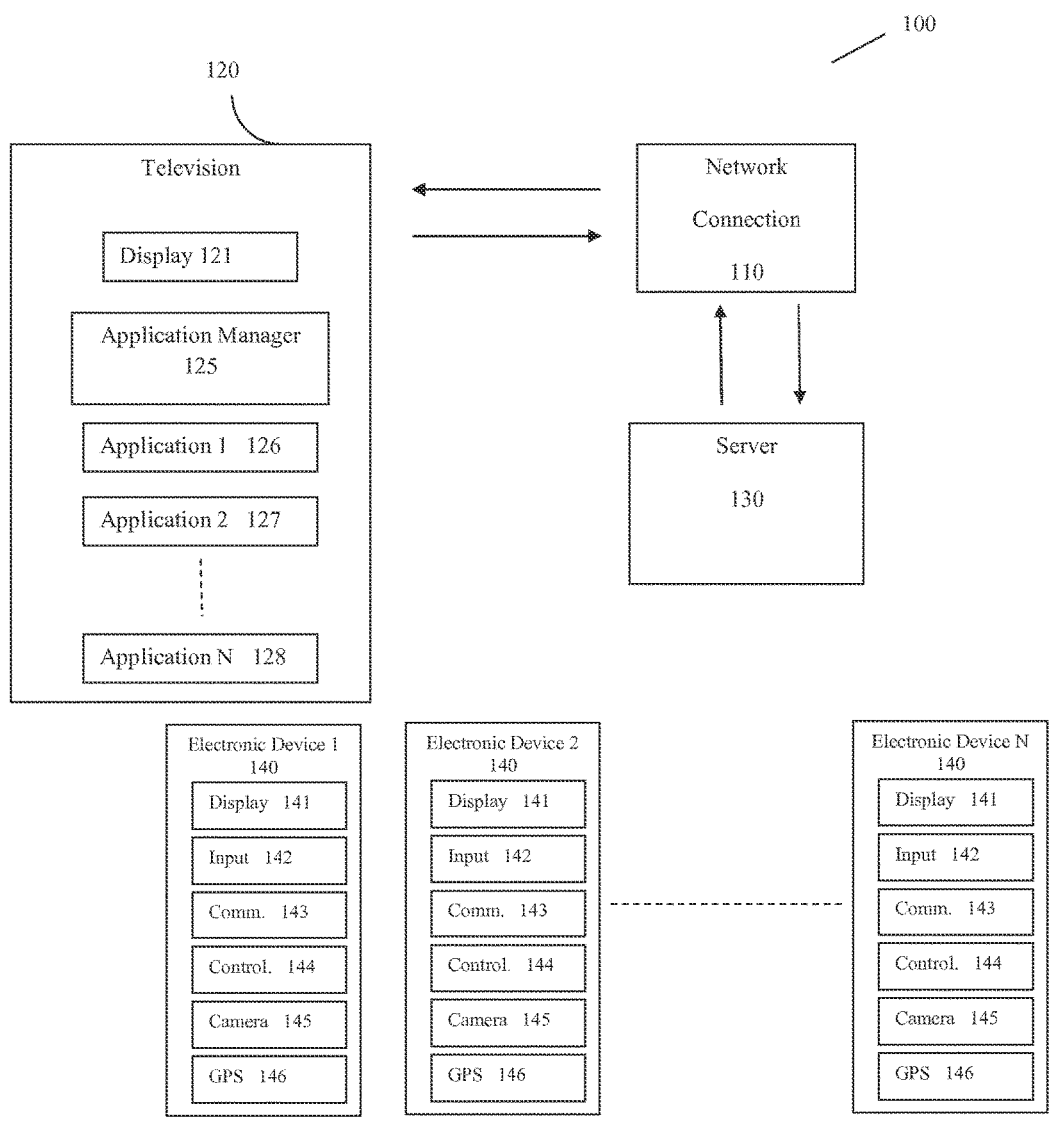
FIG. 2 shows a block diagram of an architecture system for application connection, according to an embodiment.

FIG. 2 shows a functional block diagram of an embodiment of an architecture system 100 for application connection by electronic devices 1-N 140 (N being a positive integer), according to an embodiment. In one embodiment, the system 100 comprises a television device 120, a cloud or server device 130 and network connection device 110. In one embodiment, the television device comprises a display 121, and an application manager module 125 for managing applications, such as application 1 126, application 2 127 up to application N 128, N being a positive integer.

In one embodiment, the display 121 may be a separate device from the television device 120 or integrated with the television device 120. In one embodiment, the network connection device 110 may comprise a network interface, such as a network modem, router, etc. for handling communications between the television device and the server device 130 and for forming a local network that the television device 120 may be connected with.

In one embodiment, both transmitting device 12 and receiving device 11 may include some or all of the features of electronics devices 1-N 140. In one embodiment, the electronic devices 1-N 140 may comprise a display 141, input mechanism 142, communications circuitry 143, control circuitry 144, a camera 145, and a global positioning system (GPS) receiver module 146, a microphone, audio output, and any other suitable components.

In one embodiment, all of the applications employed by display 141, input mechanism 142, the audio output and communications circuitry 143 may be interconnected and managed by control circuitry 144. In one example, a hand held music player capable of transmitting music to other tuning devices may be incorporated into the electronics devices 1-N 140.

In one embodiment, the audio output may include any suitable audio component for providing audio to a user of any of the electronics devices 1-N 140. For example, the audio output may include one or more speakers (e.g., mono or stereo speakers) built into an electronics device 1-N 140. In some embodiments, the audio output may include an audio component that is remotely coupled to an electronics device 1-N 140. For example, the audio output may include a headset, headphones or earbuds that may be coupled to communications device with a wire (e.g., coupled to an electronics device 1-N 150 with a jack) or wirelessly (e.g., Bluetooth® headphones or a Bluetooth® headset).

In one embodiment, display 141 may include any suitable screen or projection system for providing a display visible to the user. For example, display 141 may include a screen (e.g., an LCD screen) that is incorporated in an electronics device 1-N 140. As another example, display 141 may include a movable display or a projecting system for providing a display of content on a surface remote from an electronics device 1-N 140 (e.g., a video projector). Display 141 may be operative to display content (e.g., information regarding communications operations or information regarding available media selections) under the direction of control circuitry 144.

In one embodiment, input mechanism 142 may be any suitable mechanism or user interface for providing user inputs or instructions to an electronics device 1-N 140. Input mechanism 142 may take a variety of forms, such as a button, keypad, dial, a click wheel, or a touch screen. The input mechanism 142 may include a multi-touch screen. The input mechanism may include a user interface that may emulate a rotary phone or a multi-button keypad, which may be implemented on a touch screen or the combination of a click wheel or other user input device and a screen.

In one embodiment, communications circuitry 143 may be any suitable communications circuitry operative to connect to a communications network (e.g., communications network 110, FIG. 1) and to transmit communications operations and media from an electronics device 1-N 140 to other devices within the communications network. Communications circuitry 143 may be operative to interface with the communications network using any suitable communications protocol such as, for example, Wi-Fi (e.g., a 802.11 protocol), Bluetooth®, high frequency systems (e.g., 900 MHz, 2.4 GHz, and 5.6 GHz communication systems), infrared, GSM, GSM plus EDGE, CDMA, quadband, and other cellular protocols, VOIP, or any other suitable protocol.

In some embodiments, communications circuitry 143 may be operative to create a communications network using any suitable communications protocol. For example, communications circuitry 143 may create a short-range communications network using a short-range communications protocol to connect to other communications devices. For example, communications circuitry 143 may be operative to create a local communications network using the Bluetooth® protocol to couple an electronics device 1-N 140 with a Bluetooth® headset.

In one embodiment, control circuitry 144 may be operative to control the operations and performance of an electronics device 1-N 140. Control circuitry 144 may include, for example, a processor, a bus (e.g., for sending instructions to the other components of an electronics device 1-N 140), memory, storage, or any other suitable component for controlling the operations of an electronics device 1-N 140. In some embodiments, a processor may drive the display and process inputs received from the user interface. The memory and storage may include, for example, cache, Flash memory, ROM, and/or RAM. In some embodiments, memory may be specifically dedicated to storing firmware (e.g., for device applications such as an operating system, user interface functions, and processor functions). In some embodiments, memory may be operative to store information related to other devices with which an electronics device 1-N 140 performs communications operations (e.g., saving contact information related to communications operations or storing information related to different media types and media items selected by the user).

In one embodiment, the control circuitry 144 may be operative to perform the operations of one or more applications implemented on an electronics device 1-N 140. Any suitable number or type of applications may be implemented. Although the following discussion will enumerate different applications, it will be understood that some or all of the applications may be combined into one or more applications. For example, an electronics device 1-N 140 may include an application connection application, a dialog application, a map application, a media application (e.g., QuickTime, MobileMusic.app, or MobileVideo.app). In some embodiments, an electronics device 1-N 140 may include one or several applications operative to perform communications operations. For example, an electronics device 1-N 140 may include a messaging application, a mail application, a telephone application, a voicemail application, an instant messaging application (e.g., for chatting), a videoconferencing application, a fax application, or any other suitable application for performing any suitable communications operation.

In some embodiments, an electronics device 1-N 140 may include a microphone. For example, an electronics device 1-N 140 may include a microphone to allow the user to transmit audio (e.g., voice audio) during a communications operation or as a means of establishing a communications operation or as an alternate to using a physical user interface. A microphone may be incorporated in an electronics device 1-N 140, or may be remotely coupled to an electronics device 1-N 140. For example, a microphone may be incorporated in wired headphones, or a microphone may be incorporated in a wireless headset.

In one embodiment, an electronics device 1-N 140 may include any other component suitable for performing a communications operation. For example, an electronics device 1-N 140 may include a power supply, ports or interfaces for coupling to a host device, a secondary input mechanism (e.g., an ON/OFF switch), or any other suitable component.

In one embodiment, a user may direct an electronics device 1-N 140 to perform a communications operation using any suitable approach. As one example, a user may receive a communications request from another device (e.g., an incoming telephone call, an email or text message, an instant message), and may initiate a communications operation by accepting the communications request. As another example, the user may initiate a communications operation by identifying another communications device and transmitting a request to initiate a communications operation (e.g., dialing a telephone number, sending an email, typing a text message, or selecting a chat screen name and sending a chat request).

In one embodiment, an electronic device 1-N 140 (N being a positive integer) may comprise a mobile device that may utilize mobile device hardware functionality including: the GPS receiver module 146, the camera 145, a compass module, and an accelerometer and gyroscope module. The GPS receiver module 146 may be used to identify a current location of the mobile device (i.e., user). The compass module is used to identify direction of the mobile device. The accelerometer and gyroscope module is used to identify tilt of the mobile device.

The system 100 provides the electronic devices 1-N 140 (N being a positive integer) the ability to connect to an application launched on the television device 120, such as application 1 126, application 2 127 to application N 128. In one embodiment, the application 1 126, application 2 127 to application N 128 may comprise software applications executing on the television device 120, or executing on another device and having a visual display portion of the application shown on the display 121.

In one embodiment, the local network (e.g., a wireless network) that the television device 120 is connected to is a secured network with a security code (e.g., pass code, password, key code, etc.) providing access to the local network such that without having knowledge of the key code, the electronic devices 1-N 140 cannot pair or join the local network. In one embodiment, access is provided to the electronic devices 1-N 140 to the local network that the application is launched by means for connecting, such as by obtaining information from a server based on location of an electronic device (e.g., electronic devices 1-N 140), obtaining information from a communication (e.g., text message, email, chat, etc.), etc. In one embodiment, once an electronic device 1-N 140 is connected to the local network, the connection has a limited life for security purposes (e.g., one hour, two hours, 4 hours, etc.). In one embodiment, the security code is unique for each session.

In one embodiment, the timestamp and time to live value retrieved (e.g., from the cloud or server 130) are used by an application on an electronic device 1-N 140 to determine when to disconnect from the network. In this embodiment, the network information is time bound and the usage of the obtained information is restricted after the timestamp has expired.

In one embodiment, after an electronic device 1-N 140 connects to an application (e.g., application 1 126) on the television device 120, the electronic device 1-N 140 is disconnected from the network if it moves out of the wireless range of the network. In one embodiment, the connection information would have to be obtained again by the electronic device 1-N 140 in order to re-establish the connection. In one embodiment, the connection information may be obtained from any other electronic device 1-N 140 that may have the connection information.

Figure 3:
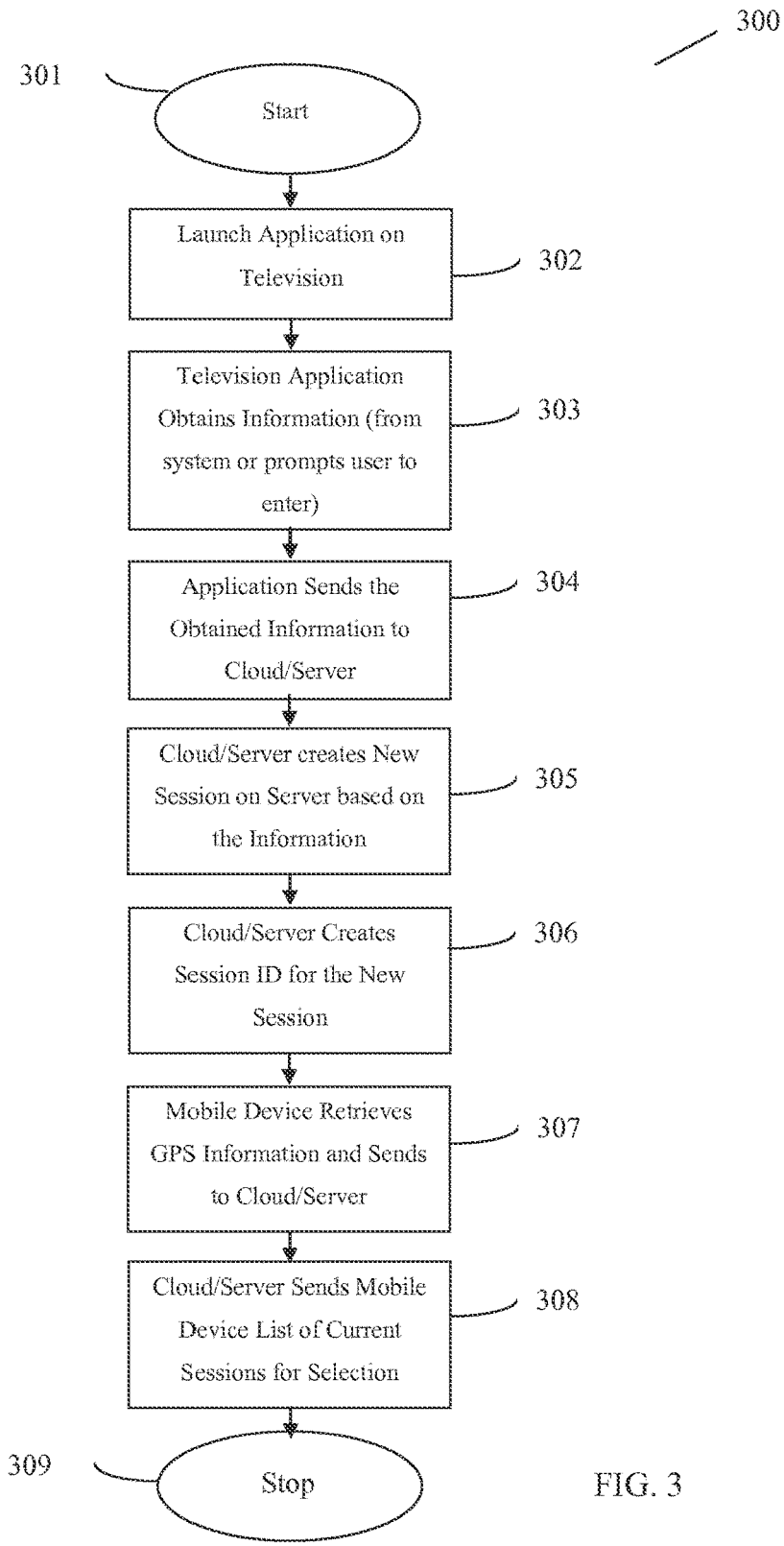
FIG. 3 shows an example flow chart for application connection, according to an embodiment.

FIG. 3 shows an example flow chart process 300 for application connection in a network, according to an embodiment. In one embodiment, the process 300 starts with block 301. In one embodiment, in block 302 an application (e.g., Application 1 126, Application 2 127 to Application N 128) is launched on a television device, such as television device 120 (FIG. 1). In one embodiment, in block 303 the television application obtains information from the local network and/or from the user (e.g., via prompting for information entry). In one embodiment, the information may comprise a wireless network service set identification (SSID), network key (e.g., a number (e.g., 12345), an alphanumeric code (e.g., ABC123), etc.), a television device's Internet protocol (IP) address, session date and time, a timestamp, and time to live, session name, host's name, host's physical address, etc. In one embodiment, a java script object notation (JSON) string is formed from the compiled information obtained in block 303 (e.g., {"SSID": "Samsung," "NKEY": "12345," "TVIP": "1.2.3.4," "Timestamp": "12345," "TTL,": "12"}). In one embodiment, the JSON string is encrypted (e.g., by known encryption techniques).

Process 300 continues with block 304 where the obtained information is sent to a cloud or server (e.g., cloud or server 130). In one embodiment, in block 305, the cloud or server creates a new session based on the received information. In block 306, the server creates a session ID for the new session. In one embodiment, in block 307, a mobile device (e.g., electronic device 1-N 140, FIG. 1) retrieves GPS information (e.g., GPS coordinates) from its GPS receiver module (e.g., GPS receiver module 146) and sends this information to the cloud/server. In one embodiment, in block 308, the cloud/server sends the mobile device a list of current sessions in the local area of the mobile device based on the received GPS information. A user may then select a session to join based on the received list that is displayed on the mobile device (e.g., display 141). In block 309 the process 300 stops.

Figure 4:
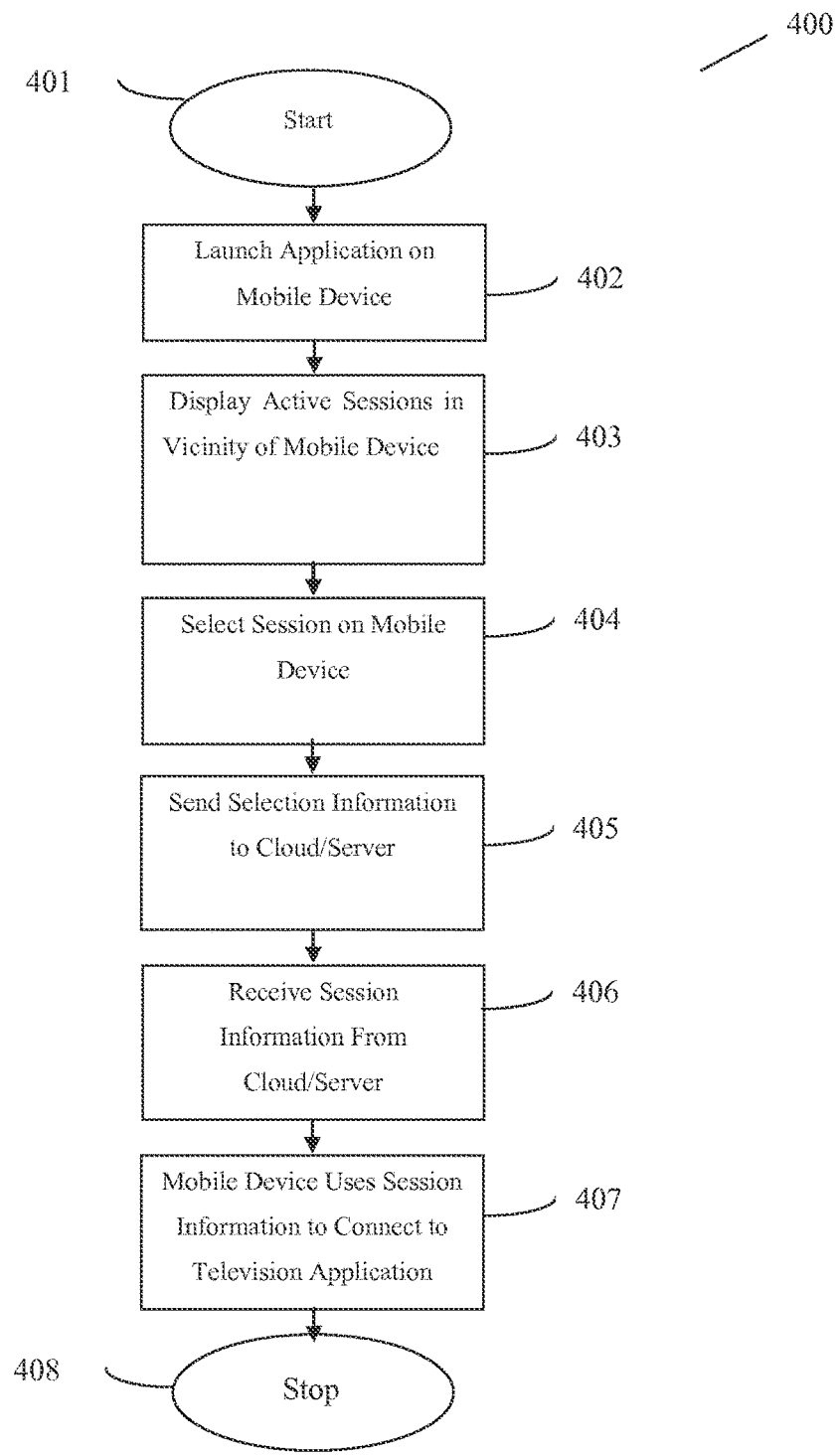
FIG. 4 shows another example flow chart for application connection, according to an embodiment.

FIG. 4 shows an example flow chart process 400 for application connection in a network, according to an embodiment. In one embodiment, the process 400 starts with block 401. In one embodiment, in block 402, a mobile device application is launched on a mobile device, such as an electronic device 1-N 140 (FIG. 2). In block 403, active local television application sessions that are received from the cloud/server are displayed on the mobile device. In one embodiment, in block 404, a particular session is selected for accessing a television application in a local network. In block 405, the selected session information is sent to the cloud/server. In block 406, the cloud/server sends back local network information to the mobile device based on the selected session (e.g., Wi-Fi SSID, session ID, IP address of the television device, network key, etc.). In one embodiment, in block 407, the mobile device uses the information received to connect to the television application of the selected session. In block 408, the process 400 stops.

Figure 5:
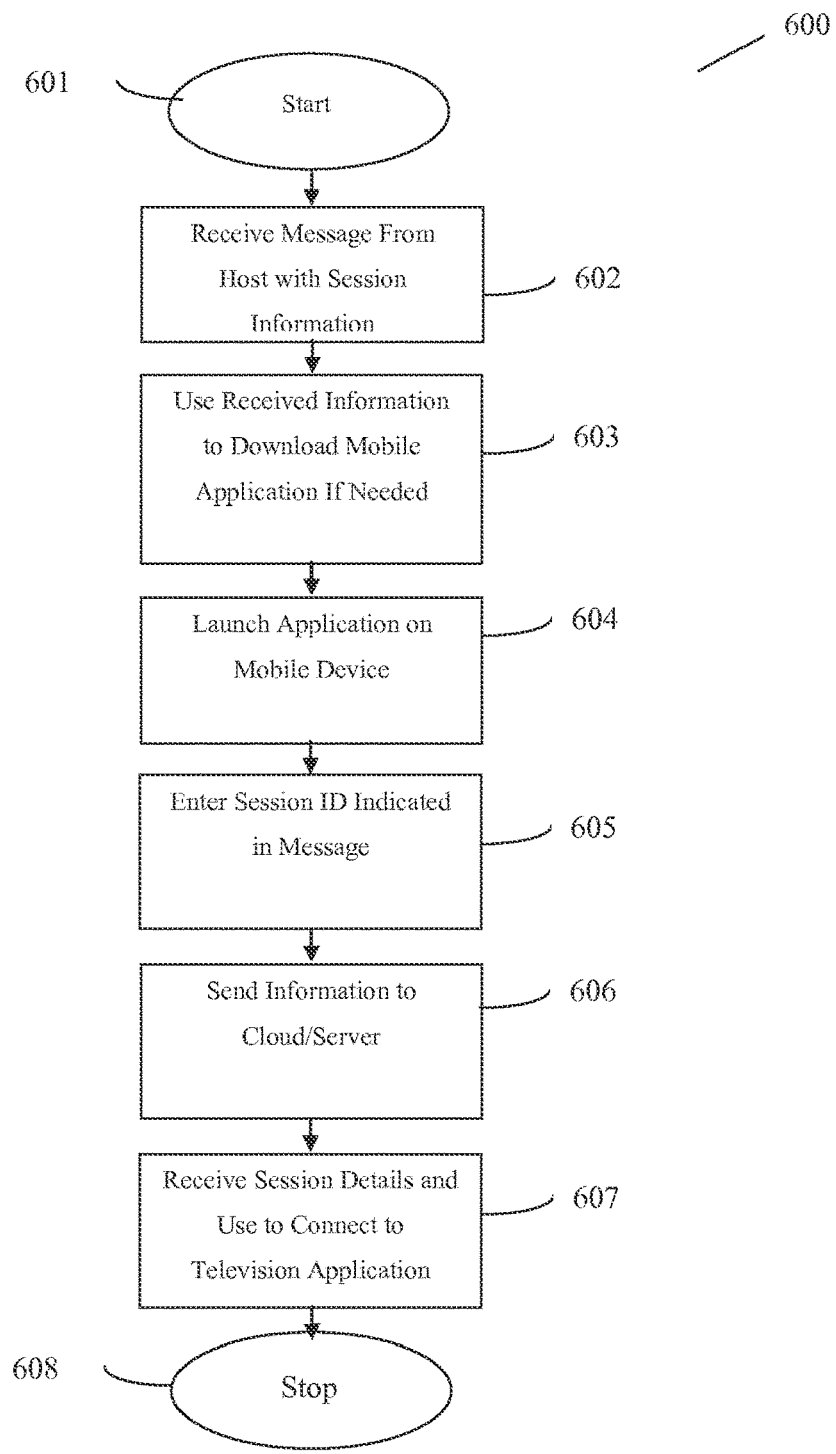
FIG. 5 shows an example flow chart for application connection, according to an embodiment.

FIG. 5 shows an example flow chart process 600 for application connection in a network, according to an embodiment. In one embodiment, the process 600 starts with block 601. In one embodiment, in block 602, a mobile device, such as an electronic device 1-N 140 (FIG. 2), receives a message (e.g., email, text message, etc.) from a host that includes a television application session information (e.g., session ID). In block 603, the mobile device downloads a mobile device application if the application is not currently loaded on the mobile device, where the mobile device application assists with connecting to a television application. In one embodiment, the received message includes a link for downloading the mobile device application. In block 604, the mobile device launches the application. In one embodiment, in block 605, the user enters the session ID as requested/prompted by the application on the mobile device. In one embodiment, in block 606, the mobile device application sends the session ID information to the cloud/server. In block 607, the cloud/server sends the mobile device session details for allowing the mobile device to connect to the television application session on the local network. In block 608, the process 600 stops.

Figure 6:
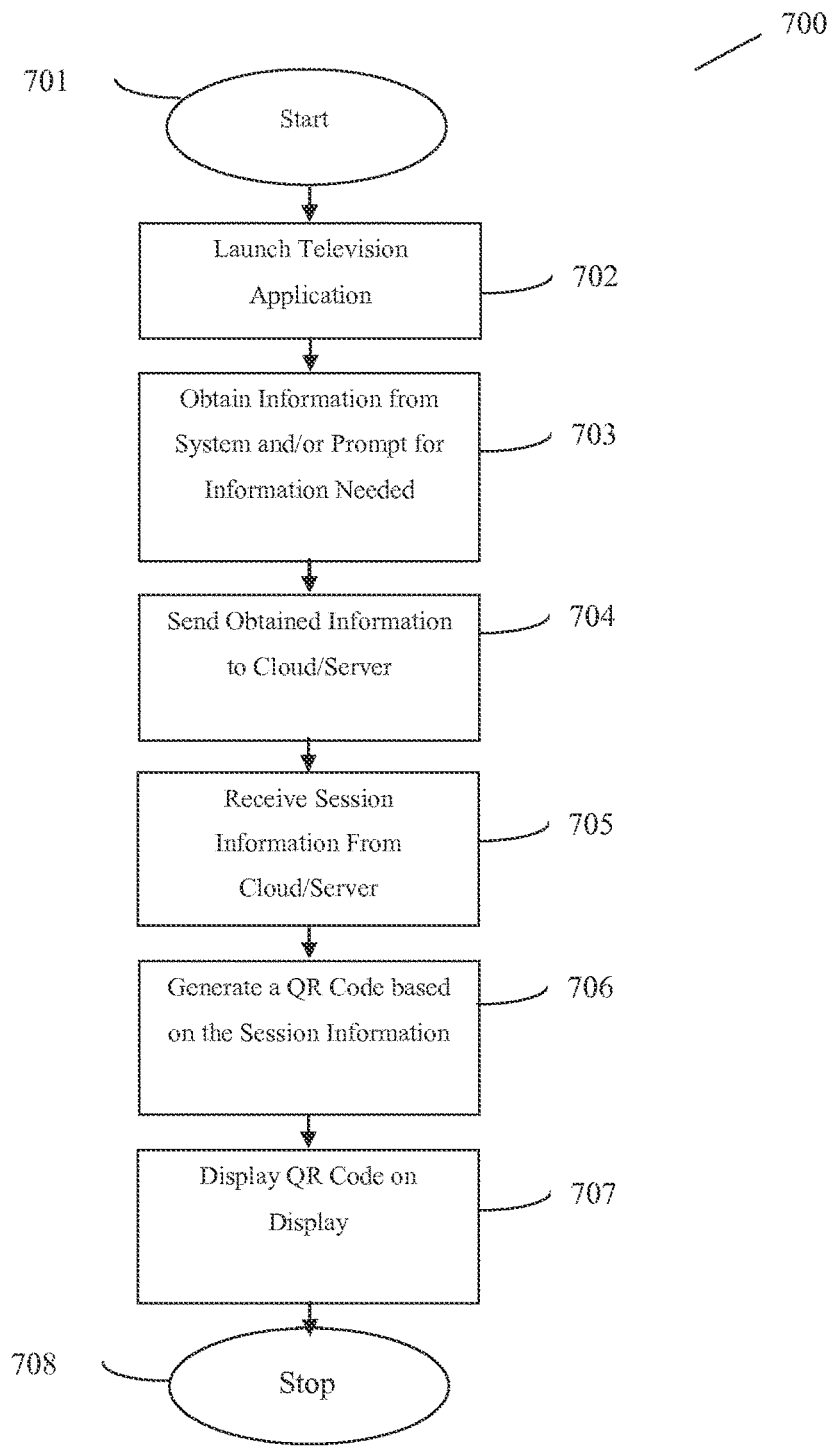
FIG. 6 shows another example flow chart for application connection, according to an embodiment.

FIG. 6 shows an example flow chart process 700 for application connection in a network, according to an embodiment. In one embodiment, the process 700 starts with block 701. In one embodiment, in block 702 an application (e.g., Application 1 126, Application 2 127 to Application N 128) is launched on a television device, such as television device 120 (FIG. 1). In one embodiment, in block 703, the television application obtains information from the local network and/or from the user (e.g., via prompting for information entry). In one embodiment, the information may comprise a wireless network service set identification (SSID), network key (e.g., a number (e.g., 12345), an alphanumeric code (e.g., ABC123), etc.), a television device's Internet protocol (IP) address, session date and time, a timestamp, and time to live, session name, host's name, host's physical address, etc. In one embodiment, a java script object notation (JSON) string is formed from the compiled information obtained in block 303 (e.g., {"SSID": "Samsung," "NKEY": "12345," "TVIP": "1.2.3.4," "Timestamp": "12345," "TTL,": "12"}). In one embodiment, the JSON string is encrypted (e.g., by known encryption techniques).

In one embodiment, in block 704, the obtained information is sent to the cloud/server (e.g., cloud or server 130). In one embodiment, the cloud or server creates a new session based on the received information and creates a session ID. Process 700 continues to block 705, where the television application receives the session information from the cloud/server. In one embodiment, in block 706, a quick response (QR) code is generated based on the session information received from the cloud/server. In block 707, the QR code is displayed on a display (e.g., display 121). In block 708, the process 700 stops.

Figure 7:
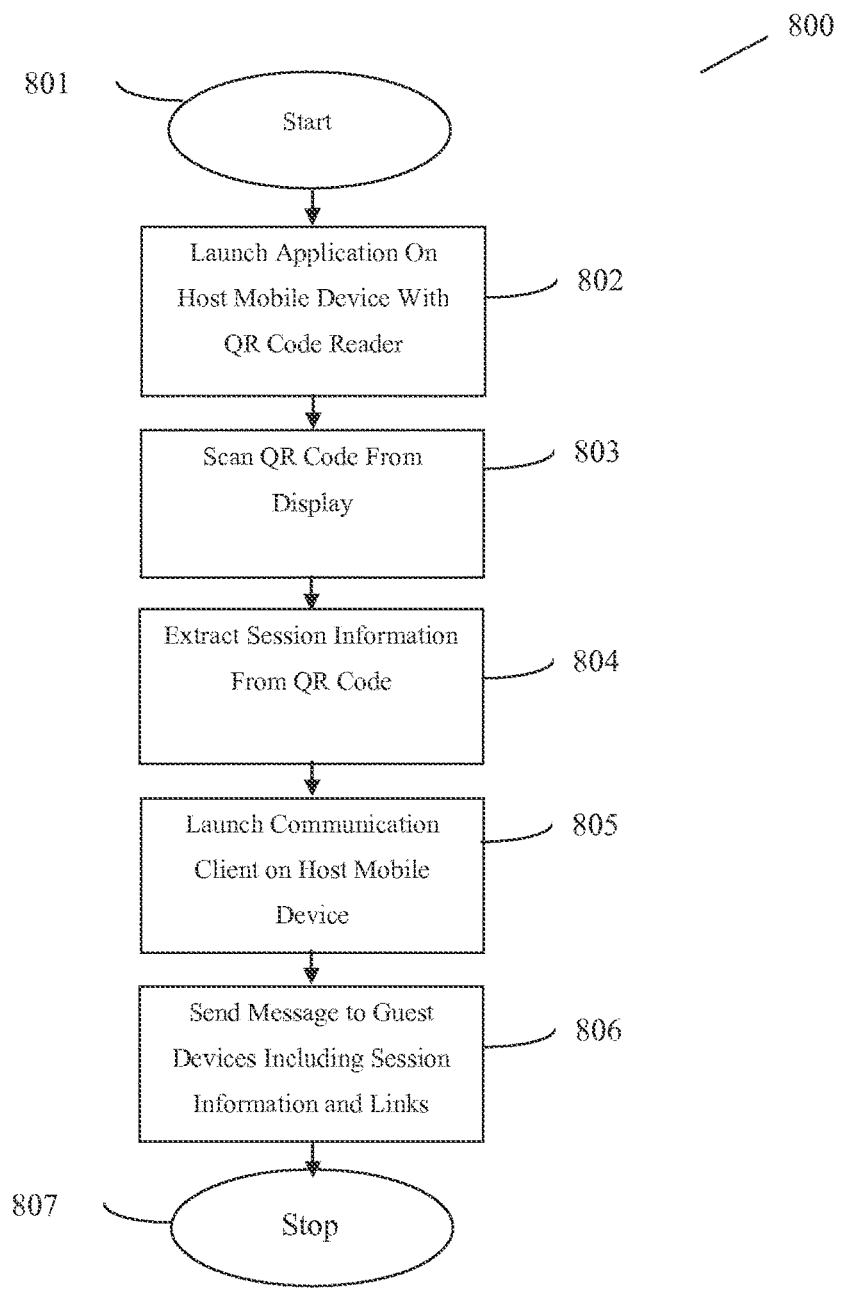
FIG. 7 shows another example flow chart for application connection, according to an embodiment.

FIG. 7 shows an example flow chart process 800 for application connection in a network, according to an embodiment. In one embodiment, the process 800 starts with block 801. In one embodiment, in block 802, a mobile device application is launched on a host's mobile device (e.g., electronic device 2 140) that includes a QR code reader (e.g., an application that uses a camera 145 (FIG. 1) for scanning). In one embodiment, in block 803, a QR code that is displayed by a television application on a display (e.g., display 141, FIG. 1) is scanned in by the host's mobile device. In one embodiment, in block 804, session information is extracted from the scanned QR code by the host's mobile device. In one embodiment, in block 805, a communication client (e.g., email client, text messaging client, etc.) is launched on the host's mobile device. In block 806, a message is sent to a guest using the communication client, where the message includes information (e.g., SSID (e.g., "Samsung"), link to application download site, etc.). In block 807, process 800 stops.

Figure 8:
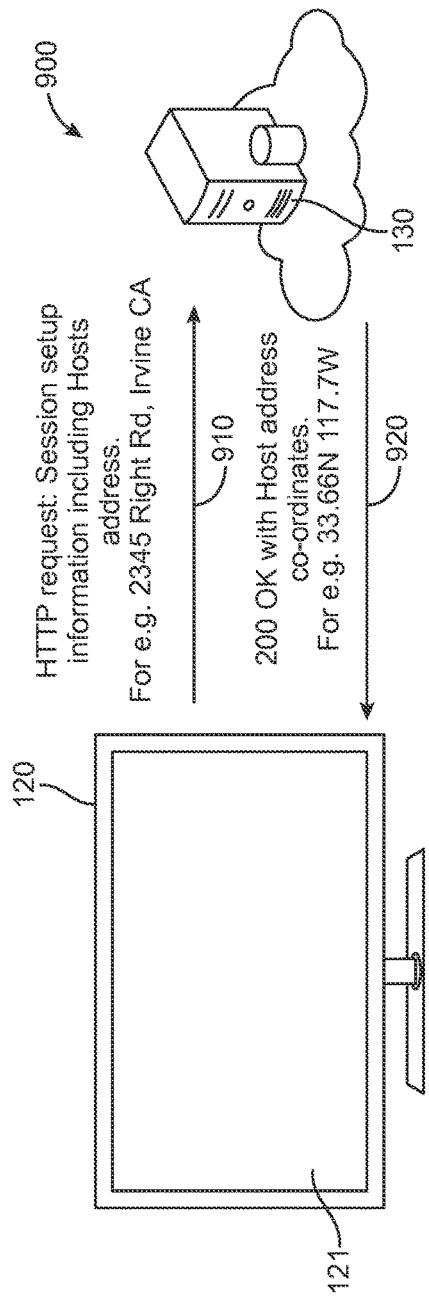
FIG. 8 shows an example scenario for application connection, according to an embodiment.

FIG. 8 shows an example scenario 900 for application connection in a network of the television device 120, according to an embodiment. In one embodiment, the television device 120 prompts the user on the display 121 to enter setup information that is related to the network session, such as session name, host's name and host's home address (e.g., 2345 Right Rd., Irvine, Calif.), for example using a remote control device, from a paired electronic device, etc. In one embodiment, the television device 120 connects to a cloud or server 130 and sends a request 910 (e.g., HTTP request) and uploads the home address information to the cloud or server 130. In one embodiment, the server responds via a reply 920 with the hosts GPS location based on reverse lookup of the address (e.g., 33.66N 117.7W).

In one embodiment, the application (e.g., application 1 126) running on the television device 120 retrieves information from the local network, such as wireless SSID, security key and IP address of the television device 120. In one embodiment, if the television device 120 is wire connected to the local network (e.g., via Ethernet) and does not have the required network information, the application prompts the user to enter the network information.

Figure 9:
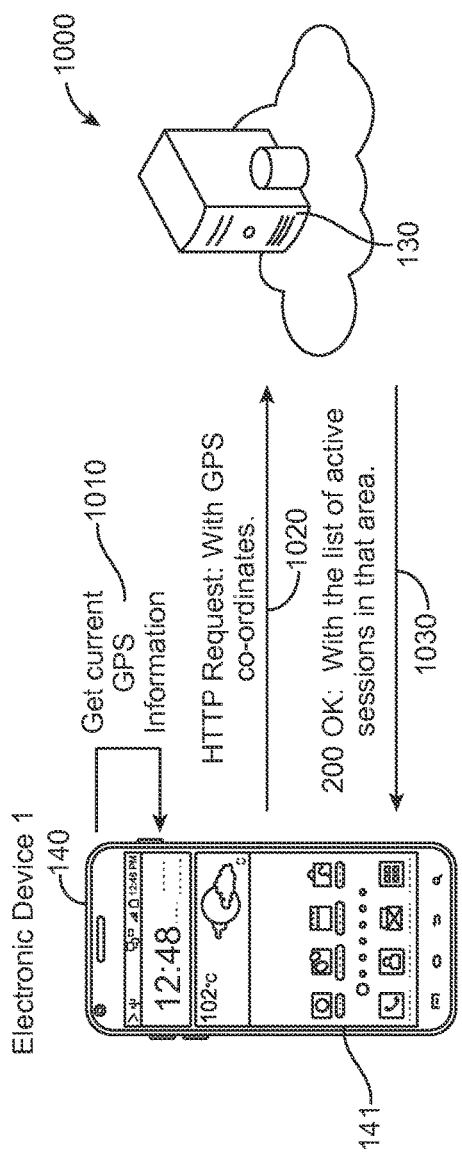
FIG. 9 shows another example scenario for application connection, according to an embodiment.

FIG. 9 shows an example scenario 1000 for application connection in a network of the television device 120, according to an embodiment. In one embodiment, an application of a guest's electronic device 1 140 retrieve's the GPS location 1010 of the electronic device 1 140 and sends the GPS location 1010 to the cloud or server 130 using a request 1020, and the cloud or server 130 responds with a reply 1030 that includes a list 1110 (FIG. 10) of active sessions in the area of the GPS location 1010.

Figure 10:
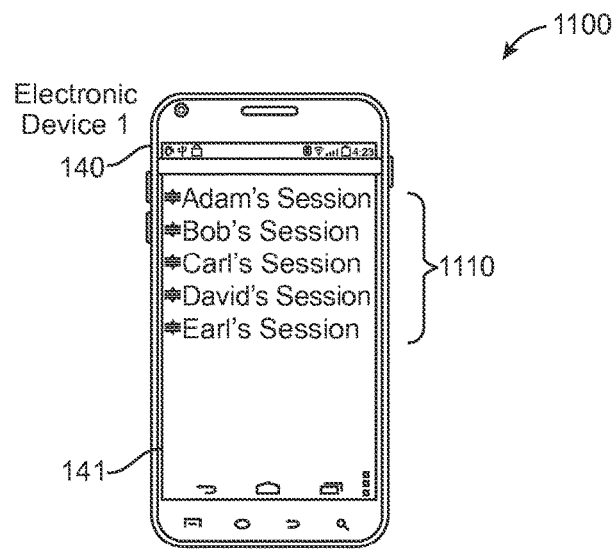
FIG. 10 shows another example scenario for application connection, according to an embodiment.

FIG. 10 shows an example scenario 1100 for application connection in a network of the television device 120, according to an embodiment. In one embodiment, the list 1110 of active sessions is displayed on display 141 of the guest's electronic device 1 140. The user then selects one option out of the list 1110 displayed on the display 141. In one embodiment, the electronic device 1 140 downloads the information related to the selected session from the cloud or server 130. The application of the electronic device 1 140 uses the downloaded information to connect to the local wireless network. Once connected, the electronic device 1 140 may use the television device 120 IP address to communicate with the application running on the television device 120.

In one embodiment, the timestamp and time to live value retrieved from the cloud or server 130 are used by the application on the electronic device 1 140 to determine when to disconnect from the local network network. After an electronic device 1 140 moves out of the wireless range of the local network, the electronic device 1 140 disconnects from the local network and the session information may have to be obtained again in order to re-establish the connection.

Figure 11:
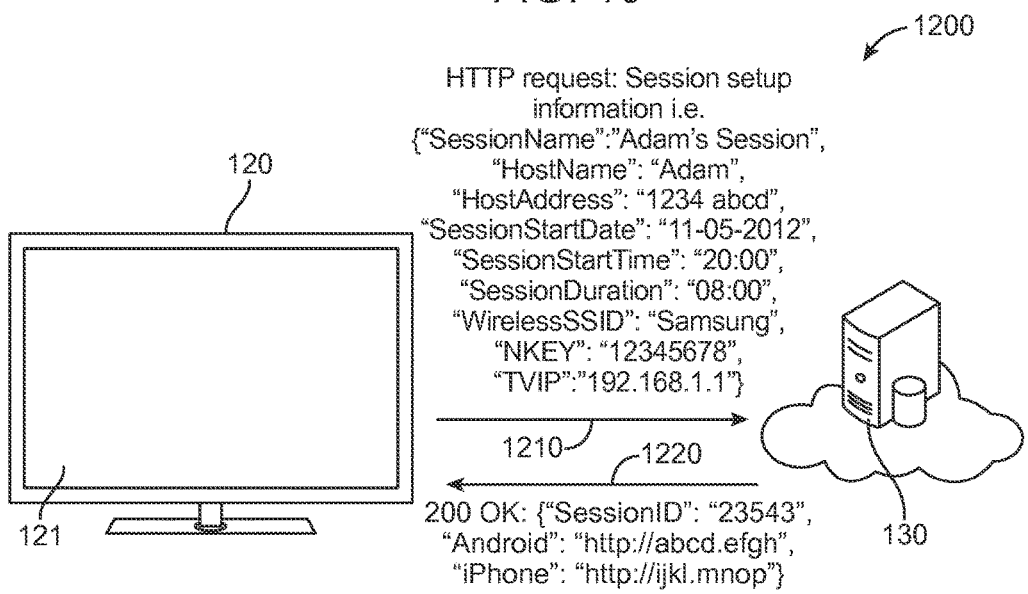
FIG. 11 shows another example scenario for application connection, according to an embodiment.

FIG. 11 shows an example scenario 1200 for application connection in a network of the television device 120, according to an embodiment. In one embodiment, the host television device 120 connects to a cloud or server 130 and sends a request 1210 (e.g., HTTP request) and uploads session setup information from the local network to the cloud or server 130, for example: "SessionName": "Adam's Session," "HostName:" "Adam;" "HostAddress:" "1234 ABCD;" "SessionStartDate:" "11-05-2012;" "SessionTime:" "20:00;" "SessionDuration:" "08:00;" "WirelessSSID:" "Samsung;" "NKEY:" "12345678;" "TVIP:" "192.168.1.1," etc. In one embodiment, the cloud or server 130 generates a unique session ID based on the received information from the host television device 120. In one embodiment, the cloud or server 130 determines where the mobile device application on different platforms may be found (e.g., URL for the application on an Android® market, etc.). In one embodiment, session ID and the location information for the mobile device application is also sent back to the host television device 120 in a reply message 1220.

Figure 12:
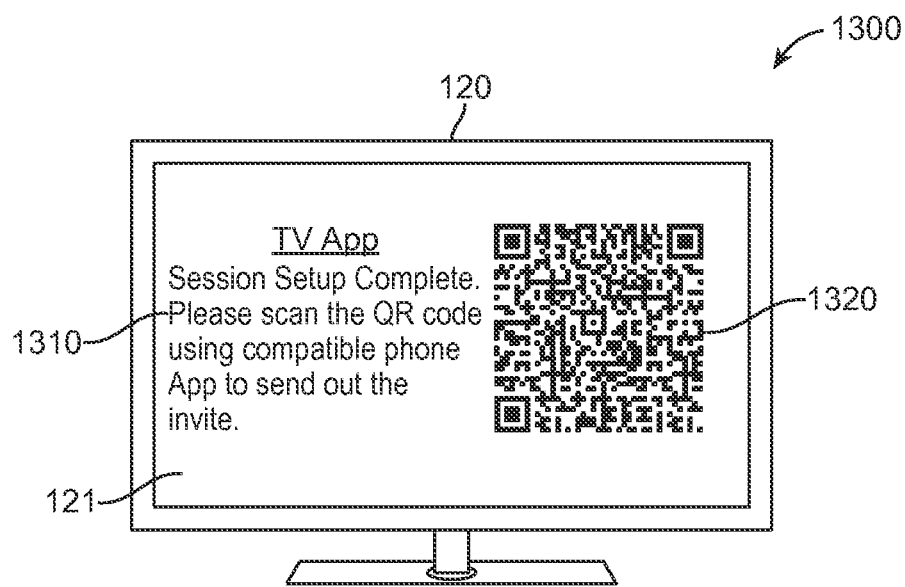
FIG. 12 shows another example scenario for application connection, according to an embodiment.

FIG. 12 shows an example scenario 1300 for application connection in a network of the television device 120, according to an embodiment. In one embodiment, once the host television device 120 receives the session ID and location information for a mobile device application for connecting to the television device application (e.g., application 1 126, FIG. 2), the host television device 120 generates a QR code 1320 on the display 121, and informs the host of the status 1310. In one embodiment, the television application also presents instructions for using the QR code, such as "Please scan the QR code using compatible phone App to send out the invite."

Figure 13:
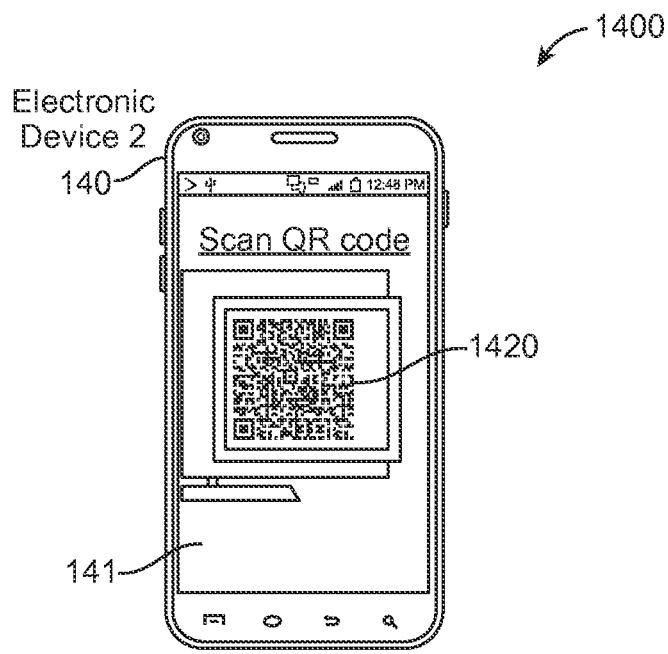
FIG. 13 shows another example scenario for application connection, according to an embodiment.

FIG. 13 shows an example scenario 1400 for application connection in a network of the television device 120, according to an embodiment. In one embodiment, a host mobile electronic device (e.g., electronic device 2 140, FIG. 2) is used to scan the QR code from the host television device (e.g., television device 120, FIG. 2). In one embodiment, the scanned QR code 1420 is shown on the display (e.g., 141, FIG. 2) of the mobile device. In one embodiment, the scanning of the QR code by a mobile device application automatically launches a Host Phone's email client with the Session ID and other information in it. In one embodiment, the email would also include URL's from where the mobile device application may be downloaded. The host mobile device may then be used to compose the invite, add guests, and send out the invite to the selected guests.

Figure 14:
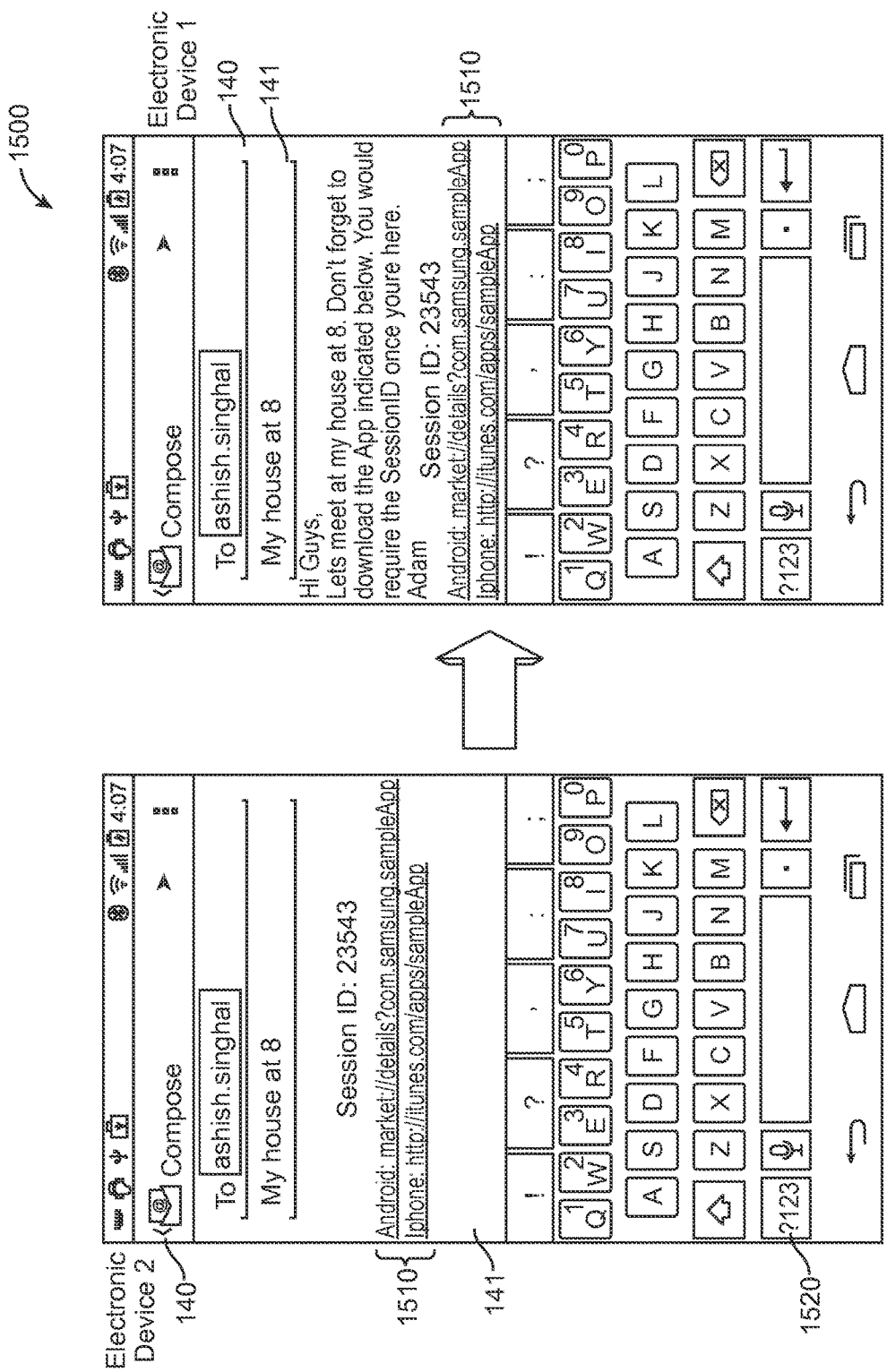
FIG. 14 shows another example scenario for application connection, according to an embodiment.

FIG. 14 shows an example scenario 1500 for application connection in a network of the television device 120, according to an embodiment. In one embodiment, after using the scenarios 1300 and 1400, a host's electronic device (e.g., electronic device 2 140) is used to compose and send an invite (e.g., composed using an electronic keyboard 1520) communication that includes a unique identifier 1510 to a guest's electronic device 1 140. In one embodiment, using the unique identifier 1510 sent in the invite shown on display 141, the guest's electronic device 1 140 application retrieves the session information from the cloud or server 130 using the unique identifier 1510. The electronic device 1 140 application uses the session information to connect to the local network. In one embodiment, once connected, the electronic device 1 140 uses the IP address of television device 120 to communicate with the application of the television device 120. In one embodiment, along with the session ID, a link (e.g., URL) of a location of where a mobile device application may be downloaded or otherwise obtained from. If the user of the electronic device 1 140 does not already have the mobile device application, the link may be used for downloading and launching the mobile device application on the electronic device 1 140. Once the mobile device application is downloaded, the guests start the mobile device application and enter the session ID they received in the invite. The guests would then be able to access the session on the server.

In one embodiment, once the guests are at the host's location (e.g., house) and they start the mobile device application, the mobile device application checks if the current time matches the Session Active time. If it does, the mobile device application automatically downloads the hosts' SSID, Network Key and IP address information. This would allow the host television application to connect to the Host's wireless local network. Once the host television application is connected, the guest's mobile electronic devices may use the IP address of television device 120 to communicate with the television application.

Figure 15:
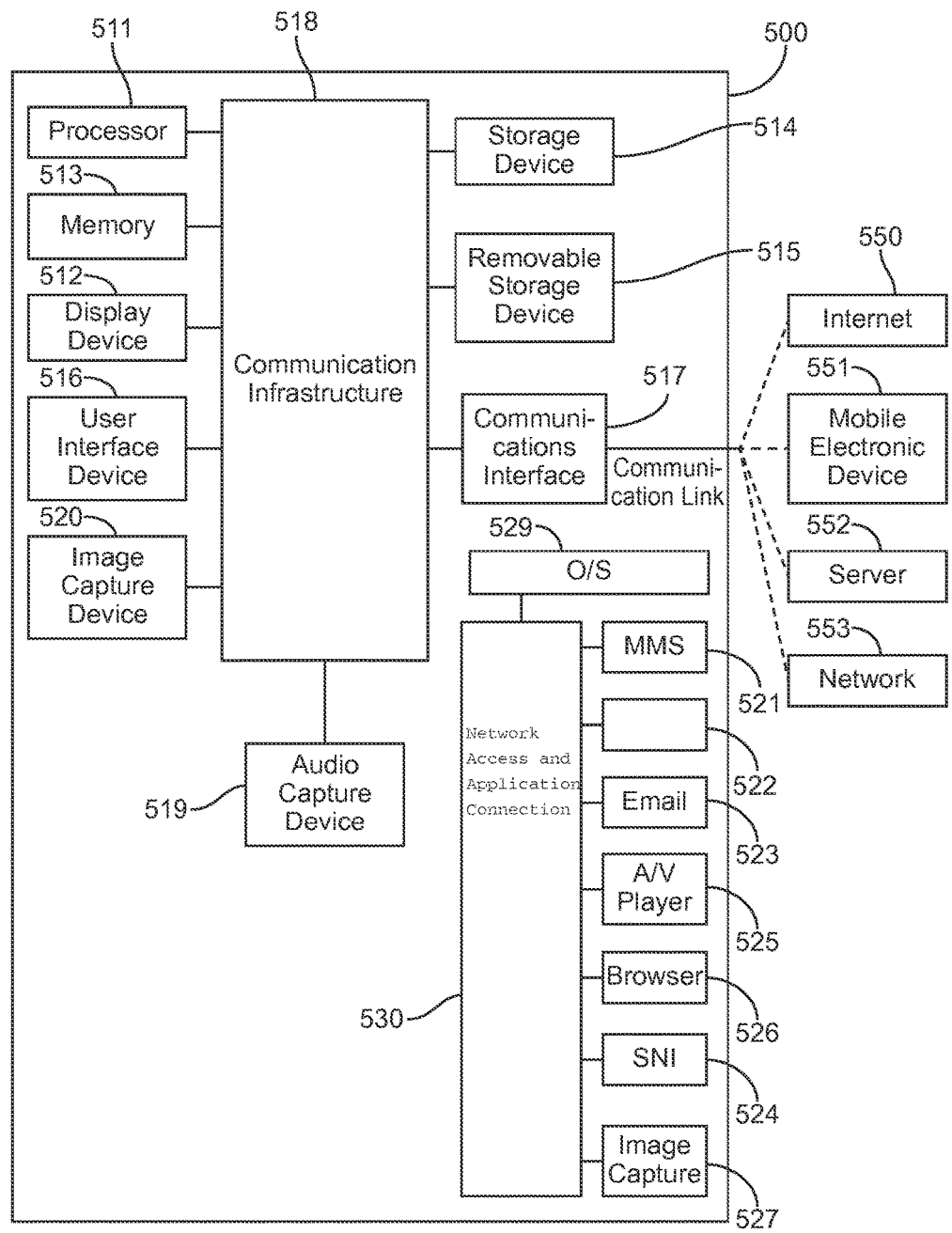
FIG. 15 is a high-level block diagram showing an information processing system comprising a computing system implementing an embodiment.

FIG. 15 is a high-level block diagram showing an information processing system comprising a computing system 500 implementing an embodiment. The system 500 includes one or more processors 511 (e.g., ASIC, CPU, etc.), and can further include an electronic display device 512 (for displaying graphics, text, and other data), a main memory 513 (e.g., random access memory (RAM)), storage device 514 (e.g., hard disk drive), removable storage device 515 (e.g., removable storage drive, removable memory module, a magnetic tape drive, optical disk drive, computer-readable medium having stored therein computer software and/or data), user interface device 516 (e.g., keyboard, touch screen, keypad, pointing device), and a communication interface 517 (e.g., modem, wireless transceiver (such as WiFi, Cellular), a network interface (such as an Ethernet card), a communications port, or a PCMCIA slot and card). The communication interface 517 allows software and data to be transferred between the computer system and external devices. The system 500 further includes a communications infrastructure 518 (e.g., a communications bus, cross-over bar, or network) to which the aforementioned devices/modules 511 through 517 are connected.

The information transferred via communications interface 517 may be in the form of signals such as electronic, electromagnetic, optical, or other signals capable of being received by communications interface 517, via a communication link that carries signals and may be implemented using wire or cable, fiber optics, a phone line, a cellular phone link, an radio frequency (RF) link, and/or other communication channels.

In one implementation, in a mobile wireless device such as a mobile phone, the system 500 further includes an image capture device such as a camera 15. The system 500 may further include application modules as MMS module 521, SMS module 522, email module 523, social network interface (SNI) module 524, audio/video (AV) player 525, web browser 526, image capture module 527, etc.

The system 500 further includes a discovery module 11 as described herein, according to an embodiment. In one implementation of network access and application connection processes 530 along with an operating system 529 may be implemented as executable code residing in a memory of the system 500. In another embodiment, such modules are in firmware, etc.

One or more of the described embodiments may provide a convenient way for many guest's of a host that may desire access to a television device application on a wireless network in order to connect their handheld devices application with the television device application. In using n or more of the described embodiments, no need is required for network based discovery employing, for example, universal plug and play (UPnP) protocol as the IP address of a television device may be distributed as part of a QR code.

As is known to those skilled in the art, the aforementioned example architectures described above, according to said architectures, can be implemented in many ways, such as program instructions for execution by a processor, as software modules, microcode, as computer program product on computer readable media, as analog/logic circuits, as application specific integrated circuits, as firmware, as consumer electronic devices, AV devices, wireless/wired transmitters, wireless/wired receivers, networks, multi-media devices, etc. Further, embodiments of said Architecture can take the form of an entirely hardware embodiment, an entirely software embodiment or an embodiment containing both hardware and software elements.

Embodiments have been described with reference to flowchart illustrations and/or block diagrams of methods, apparatus (systems) and computer program products according to one or more embodiments. Each block of such illustrations/diagrams, or combinations thereof, can be implemented by computer program instructions. The computer program instructions when provided to a processor produce a machine, such that the instructions, which execute via the processor, create means for implementing the functions/operations specified in the flowchart and/or block diagram. Each block in the flowchart/block diagrams may represent a hardware and/or software module or logic, implementing one or more embodiments. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Computer program instructions representing the block diagram and/or flowcharts herein may be loaded onto a computer, programmable data processing apparatus, or processing devices to cause a series of operations performed thereon to produce a computer implemented process. Computer programs (i.e., computer control logic) are stored in main memory and/or secondary memory. Computer programs may also be received via a communications interface. Such computer programs, when executed, enable the computer system to perform the features of one or more embodiments as discussed herein. In particular, the computer programs, when executed, enable the processor and/or multi-core processor to perform the features of the computer system. Such computer programs represent controllers of the computer system. A computer program product comprises a tangible storage medium readable by a computer system and storing instructions for execution by the computer system for performing a method of one or more embodiments.

Though the embodiments have been described with reference to certain versions thereof; however, other versions are possible. Therefore, the spirit and scope of the appended claims should not be limited to the description of the preferred versions contained herein.

What is claimed is:

1. A method for application connection, comprising:
at a first mobile device having a processor and memory storing instructions for execution by the processor, wherein the first mobile device is a first of one or more mobile devices not yet connected to a secure local network, and the secure local network includes a first electronic device on which a first application is configured to share access to the first application and share content from the first application with the one or more mobile devices after the one or more mobile devices have connected to the secure local network:
receiving, from a second electronic device, an electronic transmission including session information that was provided by a server that created a corresponding session, wherein the session information is used by the first mobile device to connect to the secure local network and obtain access to the first application, the session information includes a session identifier for the corresponding session and text indicative of: a session name and a host name, and at least one of a uniform resource identifier (URI) information or a uniform resource locator (URL), the corresponding session is associated with the first application on the first electronic device, and the electronic transmission is addressed to the first mobile device for reception;
sending the session identifier to the server;
in response to sending the session identifier, retrieving, from the server, network information used to access the first application of the first electronic device, wherein the network information includes at least a service set identification (SSID) and a network security key associated with the secure local network; and
connecting the first mobile device to the first application via the secure local network using the network information retrieved from the server and without user input of the SSID and the network security key from a user of the first mobile device.

2. The method of claim 1, wherein receiving the session information comprises identifying the session information from a message generated by the first electronic device in response to the first electronic device having transmitted, to the server, identification content and information related to execution of the first application.

3. The method of claim 2, further comprising:
launching a second application on the first mobile device;
using the session information for retrieving, from the server by the first mobile device, information related to the execution of the first application; and
using the retrieved information by the first mobile device for connecting to the first application over the secure local network.

4. The method of claim 3, wherein:
the first electronic device is a television device, and the first application comprises a television device application;
the second application is configured to execute on the first mobile device; and
shared access to the television device application comprises shared use of the television device application simultaneously between the first electronic device, the first mobile device and the second electronic device.

5. The method of claim 4, wherein:
the first mobile device is a mobile phone; and
the network information further comprises an Internet protocol (IP) address for the first electronic device, a timestamp and a time to live (TTL).

6. The method of claim 1, wherein the first mobile device communicates to the first electronic device over the secure local network based on an Internet protocol (IP) address of the first electronic device.

7. The method of claim 1, wherein the server obtains the session information and uses the session information to generate visual content for providing a message, and the first electronic device and the second electronic device are distinct electronic devices.

8. The method of claim 7, wherein the second electronic device is a host mobile device, wherein the host mobile device provides the message through one of a text message and an email that is sent to the first mobile device for sharing access to the first application over the secure local network.

9. The method of claim 8, further comprising:
disconnecting the first mobile device from the secure local network based upon a session start time stamp and time to live value.

10. A mobile device comprising:
a processor; and
memory storing one or more programs for execution by the processor of the mobile device, wherein the mobile device is a first mobile device of one or more mobile devices not yet connected to a secure local network, and the secure local network includes a first electronic device on which a first application is configured to share access to the first application and share content from the first application with the one or more mobile devices after the one or more mobile devices have connected to the secure local network, the one or more programs including instructions for:
receiving, from a second electronic device, an electronic transmission including session information that was provided by a server that created a corresponding session, wherein the session information is used by the first mobile device to connect to the secure local network and obtain access to the first application, the session information includes a session identifier for the corresponding session and text indicative of: a session name and a host name, and at least one of a uniform resource identifier (URI) information or a uniform resource locator (URL), the corresponding session is associated with the first application on the first electronic device, and the electronic transmission is addressed to the first mobile device for reception;
sending the session identifier to the server;
in response to sending the session identifier, retrieving, from the server, network information used to access the first application of the first electronic device, wherein the network information includes at least a service set identification (SSID) and a network security key associated with the secure local network; and
connecting the first mobile device to the first application via the secure local network using the network information retrieved from the server and without user input of the SSID and the network security key from a user of the first mobile device.

11. The mobile device of claim 10, wherein the one or more mobile devices each are configured to execute a second application and to use the second application to obtain the session information from the server.

12. The mobile device of claim 10, wherein the session information further comprises active local session information.

13. The mobile device of claim 12, wherein access to the first application ends based on a particular time or distance of any of the one or more mobile devices from the first electronic device.

14. The mobile device of claim 13, wherein:
the first electronic device is a television device that is configured to operate in the secure local network; and
the second application is configured to execute on the one or more mobile devices.

15. The mobile device of claim 14, wherein each of the one or more mobile devices comprise a mobile phone device or a mobile tablet device, and the network information further comprises an Internet protocol (IP) address for the first electronic device, a timestamp and a time to live (TTL).

16. A non-transitory computer-readable storage medium storing one or more programs for execution by a processor of a first mobile device, the one or more programs including instructions for:
at the first mobile device, wherein the first mobile device is a first of one or more mobile devices not yet connected to a secure local network, and the secure local network includes a first electronic device on which a first application is configured to share access to the first application and share content from the first application with the one or more mobile devices after the one or more mobile devices have connected to the secure local network:
receiving, from a second electronic device, an electronic transmission including session information that was provided by a server that created a corresponding session, wherein the session information is used by the first mobile device to connect to the secure local network and obtain access to the first application, the session information includes a session identifier for the corresponding session and text indicative of: a session name and a host name, and at least one of a uniform resource identifier (URI) information or a uniform resource locator (URL), the corresponding session is associated with the first application on the first electronic device, and the electronic transmission is addressed to the first mobile device for reception;
sending the session identifier to the server;
in response to sending the session identifier, retrieving, from the server, network information used to access the first application of the first electronic device, wherein the network information includes at least a service set identification (SSID) and a network security key associated with the secure local network; and
connecting the first mobile device to the first application via the secure local network, using the network information retrieved from the server and without user input of the SSID and the network security key from a user of the first mobile device.

17. The non-transitory computer-readable storage medium of claim 16, wherein:
the one or more programs include instructions for:
launching a second application on the first mobile device; and
using the second application for obtaining, from the server by the first mobile device, the session information.

18. The non-transitory computer-readable storage medium of claim 16, wherein:
the session information further comprises at least one of a link to the second application, or a list of local active sessions based on location information of the first mobile device.

19. The non-transitory computer-readable storage medium of claim 18, wherein the one or more programs include instructions for:
disconnecting the first electronic device from the secure local network that the first application executes in based on at least one of an allowed access time and distance from the first electronic device executing the first application.

20. The non-transitory computer-readable storage medium of claim 19, wherein:
the first electronic device is a television electronic device; and
the second application is configured to execute on the first mobile device and a second mobile device.

21. The non-transitory computer-readable storage medium of claim 20, wherein each of the first mobile device and the second mobile device comprise a mobile phone device or a mobile tablet device; and the network information further comprises an Internet protocol (IP) address for the first electronic device, a timestamp and a time to live (TTL).

* * * * *